United States Patent
DeClercq et al.

(10) Patent No.: US 11,455,250 B2
(45) Date of Patent: Sep. 27, 2022

(54) MANAGING UNEXPECTED SHUTDOWN IN A DISK DRIVE WITH MULTIPLE ACTUATORS AND CONTROLLERS

(71) Applicant: Seagate Technology LLC, Cupertino, CA (US)

(72) Inventors: Bryce L. DeClercq, Waconia, MN (US); Steven Faulhaber, Eden Prairie, MN (US); Christopher L. Hill, Apple Valley, MN (US); David P. Bremer, Shakopee, MN (US); Steven Jerome Spaulding, Savage, MN (US)

(73) Assignee: Seagate Technology LLC, Fremont, CA (US)

( * ) Notice: Subject to any disclaimer, the term of this patent is extended or adjusted under 35 U.S.C. 154(b) by 633 days.

(21) Appl. No.: 16/460,022

(22) Filed: Jul. 2, 2019

(65) Prior Publication Data

US 2021/0004327 A1   Jan. 7, 2021

(51) Int. Cl.
| | |
|---|---|
| G06F 11/07 | (2006.01) |
| G06F 12/0804 | (2016.01) |
| G11B 21/12 | (2006.01) |

(52) U.S. Cl.
CPC ...... G06F 12/0804 (2013.01); G06F 11/0796 (2013.01); G11B 21/12 (2013.01); *G06F 2212/1032* (2013.01)

(58) Field of Classification Search
CPC .................................................. G06F 11/0796
USPC .................................................. 714/6.11, 24
See application file for complete search history.

(56) References Cited

U.S. PATENT DOCUMENTS

| | | | |
|---|---|---|---|
| 5,659,801 A * | 8/1997 | Kopsaftis | G06F 9/24 |
| | | | 712/E9.007 |
| 5,782,670 A | 7/1998 | Whisman | |
| 5,872,669 A | 2/1999 | Morehouse et al. | |
| 5,872,670 A | 2/1999 | Ataee | |
| 5,889,629 A | 3/1999 | Patton, III | |
| 6,178,486 B1 | 1/2001 | Gill et al. | |
| 6,295,577 B1 | 9/2001 | Anderson et al. | |
| 6,516,426 B1 | 2/2003 | Forehand et al. | |
| 6,763,437 B1 | 7/2004 | Nguyen et al. | |
| 6,788,567 B2 | 9/2004 | Fujimori | |
| 6,868,486 B1 | 3/2005 | Ward | |
| 7,395,452 B2 | 7/2008 | Nicholson et al. | |
| 7,533,298 B2 | 5/2009 | Smith et al. | |
| 7,904,604 B2 | 3/2011 | Lum et al. | |
| 8,090,906 B1 | 1/2012 | Blaha et al. | |
| 8,924,641 B2 | 12/2014 | Trantham et al. | |

(Continued)

*Primary Examiner* — Chae M Ko
(74) *Attorney, Agent, or Firm* — Mueting Raasch Group (57) ABSTRACT

An event that indicates unexpected shutdown of a hard disk drive is determined. The hard disk includes first and second controllers that control respective first and second independently-operable actuators. Each of the actuators has one or more heads that access one or more spinning disks of the hard disk drive. While receiving power for the hard disk drive via back-electromotive force of a motor driven by the one or more spinning disks in response to the event, the first and second controllers independently move the respective first and second actuators to safe positions. In response to determining the first and second actuators are in safe positions, write cache data associated with the first and second controllers is written to a non-volatile memory.

16 Claims, 6 Drawing Sheets

(56) References Cited

U.S. PATENT DOCUMENTS

| | | | |
|---|---|---|---|
| 9,780,700 B2 | 10/2017 | Lieu et al. | |
| 9,971,545 B1* | 5/2018 | Asnaashari | G06F 3/0676 |
| 10,042,785 B1 | 8/2018 | Buch et al. | |
| 2003/0131206 A1 | 7/2003 | Atkinson et al. | |
| 2006/0015683 A1 | 1/2006 | Ashmore et al. | |
| 2006/0164749 A1* | 7/2006 | Yamamoto | G11B 21/12 |
| 2011/0016250 A1 | 1/2011 | Lee et al. | |
| 2012/0151162 A1* | 6/2012 | Trantham | G06F 1/3206 |
| | | | 713/324 |
| 2012/0300328 A1* | 11/2012 | Coker | G11B 5/012 |
| 2013/0008725 A1 | 1/2013 | Taylor et al. | |
| 2017/0293440 A1* | 10/2017 | Saito | G06F 3/0685 |
| 2018/0059970 A1* | 3/2018 | Takazawa | G06F 3/0659 |
| 2020/0082846 A1* | 3/2020 | Sakamoto | G11B 5/4806 |
| 2020/0302955 A1* | 9/2020 | Kawamitsu | G11B 5/012 |

* cited by examiner

MANAGING UNEXPECTED SHUTDOWN IN A DISK DRIVE WITH MULTIPLE ACTUATORS AND CONTROLLERS

SUMMARY

The present disclosure is directed to a method and apparatus used to manage unexpected shutdown in a disk drive with multiple actuators and controllers. In one embodiment, an event that indicates unexpected shutdown of a hard disk drive is determined. The hard disk drive includes first and second controllers that control respective first and second independently-operable actuators. Each of the actuators includes one or more heads that access one or more spinning disks of the hard disk drive. A shutdown procedure is performed while receiving power for the hard disk drive via back-electromotive force of a motor driven by the one or more spinning disks in response to the event. The shutdown procedure involves: causing the first and second controllers to independently move the respective first and second actuators to safe positions; and, in response to determining the first and second actuators are in safe positions, causing write cache data associated with the first and second controllers to be written to a non-volatile memory.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure generally relates to data storage devices that utilize magnetic storage media, e.g., hard disk drives (HDDs). Additional HDD features described herein, generally described as "parallelism" architectures are seen as a way to increase HDD performance measures such as IOPS and reduce latency. Generally, parallelism architectures utilize multiple read/write heads in parallel. Such parallelism can increase the rate of input/output operations (IOPS) and thereby speed up certain operations. For example, the data read from two heads can be combined together into a single stream, nearly doubling the throughput rate of data sent to or received from the host. In other examples, different heads can service different read or write requests at the same time, thereby reducing overall latency, e.g., for random data access requests.

In embodiments described below, a hard disk drive includes multiple heads driven by the same or different actuators that can read from or write to one or more disks simultaneously. This may include separate and independent reading/writing, such as heads that are servicing different read/write requests. This may also include separate and dependent reading/writing, e.g., where parts of a single stream of data are being handled by different heads at the same time. The parallelism architectures is extended to other components that operate in the HDD, including system controllers, servo controllers, read/write channels, host interfaces, caches, etc.

For example, a system controller and other computer circuitry, sometimes referred to as system-on-a-chip (SoC), can be arranged in a primary/secondary configuration. In such an arrangement, the primary SoC can be used to arbitrate some tasks with the host and other system hardware, while both the primary and secondary can perform some tasks in parallel, such as managing read and write queues targeted for different heads. In order to reduce costs and complexity, the primary and secondary SoC can use identical hardware components, the primary/secondary roles being assigned at startup. It will be understood that all of the embodiments below do not require a primary/secondary architecture, although some specific features described below may be specific to such an architecture.

Current HDDs may include systems that safeguard the drive in the event of power loss due to an unexpected shutdown. The term "safeguard" generally refers to any processes needed to prevent data loss and/or physical damage to the device. For example, each HDD read/write head may be built into a slider assembly with an air-bearing surface facing a magnetic disk. When the disks are spinning at full speed, the slider is prevented from contacting the disk by a thin layer of air. If this disk is not spinning, the slider may contact the disk surface, which could lead to loss of data at the contact point in what is sometimes referred to as a "head crash." Additionally, heads in contact with the disk surface can increase the amount of torque required to start the spindle motor. As a result, the head(s) are parked (e.g., moved to a ramp or the like) before the disk motor stops spinning.

Another example of a power loss safeguard is to store unwritten volatile data to a non-volatile memory. For example, in order to improve write performance, a HDD may buffer data transferred between the disk and a host in a volatile memory cache. This cache may include an electronic volatile memory such as dynamic random access memory (DRAM). Caching can improve command completion time, for example if there is some delay in writing the data to the media (e.g., long seek time, sectors that need extra time to write). Other non-user data may also be held in volatile RAM, such as logical-to-physical address mappings, run-time measurements, statistics, etc.

Data stored in volatile RAM may need to be preserved in a non-volatile storage in response to the loss of system power. During a normal shutdown (e.g. when commanded by a SCSI Stop Unit command), this volatile data may be written directly to the primary storage media (e.g., magnetic disk) using host power before it is removed. However, upon unexpected loss of host-system-supplied power, it generally isn't possible to transfer this data to the magnetic disks. In such a case, alternate non-volatile media such as flash memory may be used to temporarily store the data. When power is reapplied, this data may be restored from the alternate non-volatile media to the magnetic disks and/or placed back in volatile RAM.

In some implementations, the kinetic energy of the still spinning disks can be used to generate sufficient power to perform these and other power loss safeguard operations. A spindle motor can, in addition to converting electricity to motion, act as a generator, e.g., converting motion to electricity. In some systems, upon detection that host-supplied power has been lost, a circuit connects the spindle motor to a power bus. With the mass of the spinning disks providing rotational inertia, the spindle motor can often provide enough power to complete some safeguarding operations, such as retracting the read/write head actuator and storing cached write data in non-volatile memory. However, the amount of energy available this way may sometimes be insufficient to perform all desired safeguarding operations, depending on the type and configuration of the HDD.

In drives that implement parallelism, there is an increased electrical load due to increasing the number of processors and electronics per actuator in the system. Because of the increased number of electronic components, the system will be designed to shed electrical load from non-essential components as soon as possible to preserve energy in response to unexpected shutdown. In addition, during shutdown multiple actuators may be simultaneously retracting. These retract events may be closely coordinated (or caused to retract non-simultaneously) when being powered by BEMF to limit power usage spikes. Actuator braking and retract (head unload) can be similarly managed on multiple actuators to limit power usage spikes.

In addition to retracting multiple actuators, a drive implementing parallelism may also need to back up multiple, independent data sets (e.g., write caches) that are in volatile RAM. This data may be stored in a single non-volatile data store (e.g., flash memory) or multiple data non-volatile data stores. Depending on the drive configuration, this data may be the same or more than what needs to be backed up on conventional hard drive of equivalent storage capacity. This data backup will be coordinated both with the actuator operations as well as between multiple controllers that manage different data sets. Various details of the system design (sequencing, power shed, reduced clock rates, etc.) helps to ensure optimum power versus time system design.

Figure 1:
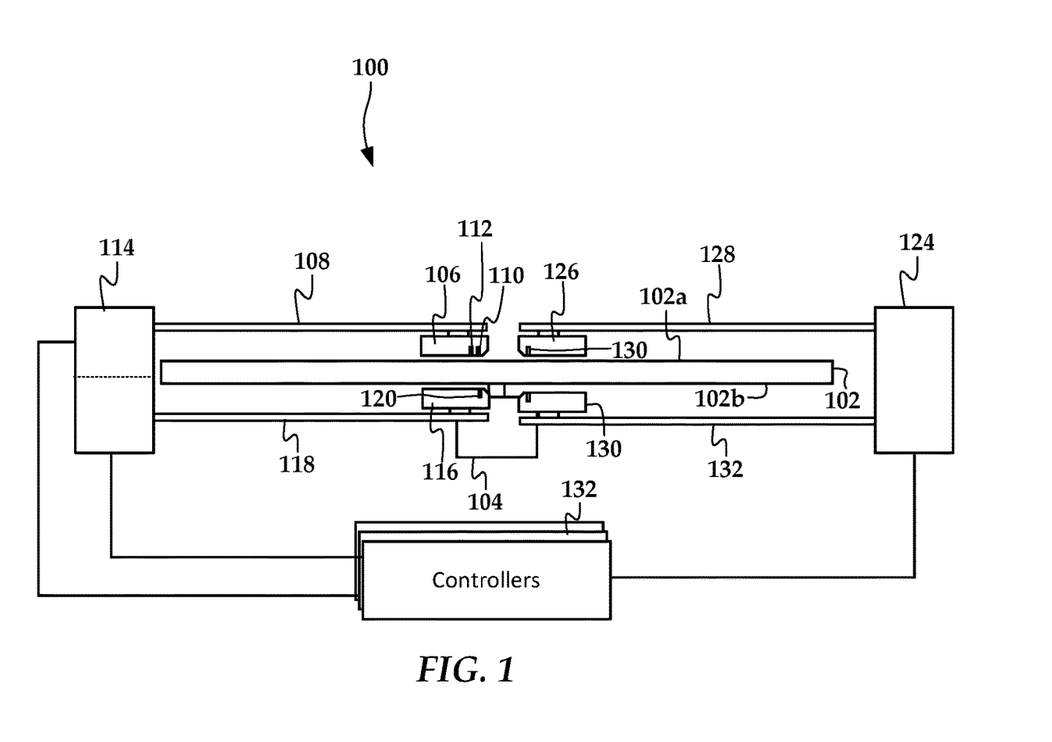
FIG. 1 is a diagram of an apparatus according to an example embodiment.

In FIG. 1, a diagram illustrates an apparatus 100 with parallelism features according to example embodiments. The apparatus 100 includes at least one magnetic disk 102 driven by a spindle motor 104. A slider 106 (also referred to as a head, read/write head, read head, write head, recording head, etc.) is held over a first surface 102a of the disk 102 by an arm 108. An actuator 114 moves (e.g., rotates) the arm 108 to place the slider 106 over different tracks on the disk 102. The actuator 114 (and other actuators described below) may at least include a voice coil motor (VCM), although the slider 106 may be moved by multiple stage actuation, e.g., a microactuator located close to the slider 106 on the arm 108. In one embodiment, the slider includes a read transducer 110 and/or a write transducer 112. The read transducer 110 provides a signal in response to changing magnetic fields on the disk 102, and is coupled to a controller (not shown) where the separate signals are independently processed. The write transducer 112 receives signals from the controller and converts them to magnetic fields that change magnetic orientations of regions on the disk 102.

The apparatus 100 includes a second slider 116 supported by a second arm 118. The second slider 116 is held over a second surface 102b of the disk 102 and actuator 114 causes the second arm 118 to move to different tracks on the disk 102. The arm 118 may move together with arm 108, or the arms 108, 118 may move independently (as indicated by dashed line on actuator 114, indicating a split actuator). In either configuration, the arms 108, 118 rotate around the same axis. The slider 116 also includes read and/or write transducers 120. The transducers 120 are capable of reading from and/or writing to disk surface 102b simultaneously with one or both of read/write transducers 110, 112 that access disk surface 102a.

In another embodiment, the apparatus 100 includes a third slider 126 supported by a third arm 128. The third slider 126 (and its associated actuation hardware) may be included instead of or in addition to the second slider 116 and second arm 118. The third slider 126 is held over the first surface 102a of the disk 102 as a second actuator 124 causes the third arm 128 to move to different tracks on the disk 102. The arm 128 and actuator 124 move independently of arm 108 and actuator 114. The slider 126 includes read and/or write transducers 130. The transducers 130 are capable of reading from and/or writing to disk surface 102a simultaneously with transducers 110, 112 of first slider 106. The actuator 124 may also drive arm 132 and slider 130 that accesses disk surface 102b. Arm 132 may be driven together with arm 128 or separately, e.g., where actuator 124 is split into two actuating sections.

In the examples shown in FIG. 1, more than one disk 102 may be used, and the actuators 114, 124 may be coupled to additional arms and heads that access some or all of the additional disk surfaces. In this context, "accessing" generally refers to activating a read or write transducer and coupling the transducer to a read/write channel for purposes of reading from or writing to the disk 102. Independently movable heads that utilize a split actuator 114 may generally simultaneously access different surfaces, e.g., heads 106 and 116 access different surfaces 102a, 102b at the same time. Independently movable heads that utilize non-coaxial actuators 114, 124 may access the same surface at the same time, e.g., heads 106 and 126 may both access surface 102a at the same time, as well as accessing different surfaces at the same time.

Two or more controllers 132 are coupled to the respective actuators 114, 124 and control movement of the actuators 114, 124. The controllers 132 may include SoC that perform such operations as servo control, encoding and decoding of data written to and read from the disk 102, queuing and formatting host commands, etc. As described in greater details below, one of the controllers 132 may be designated as a primary and the others as auxiliaries or secondaries. Thus, while the controllers 132 may have otherwise identical hardware, they may perform differently, e.g., due to different firmware and/or software instructions that are executed at start up based on a voltage set at a specified input port.

Figure 2:
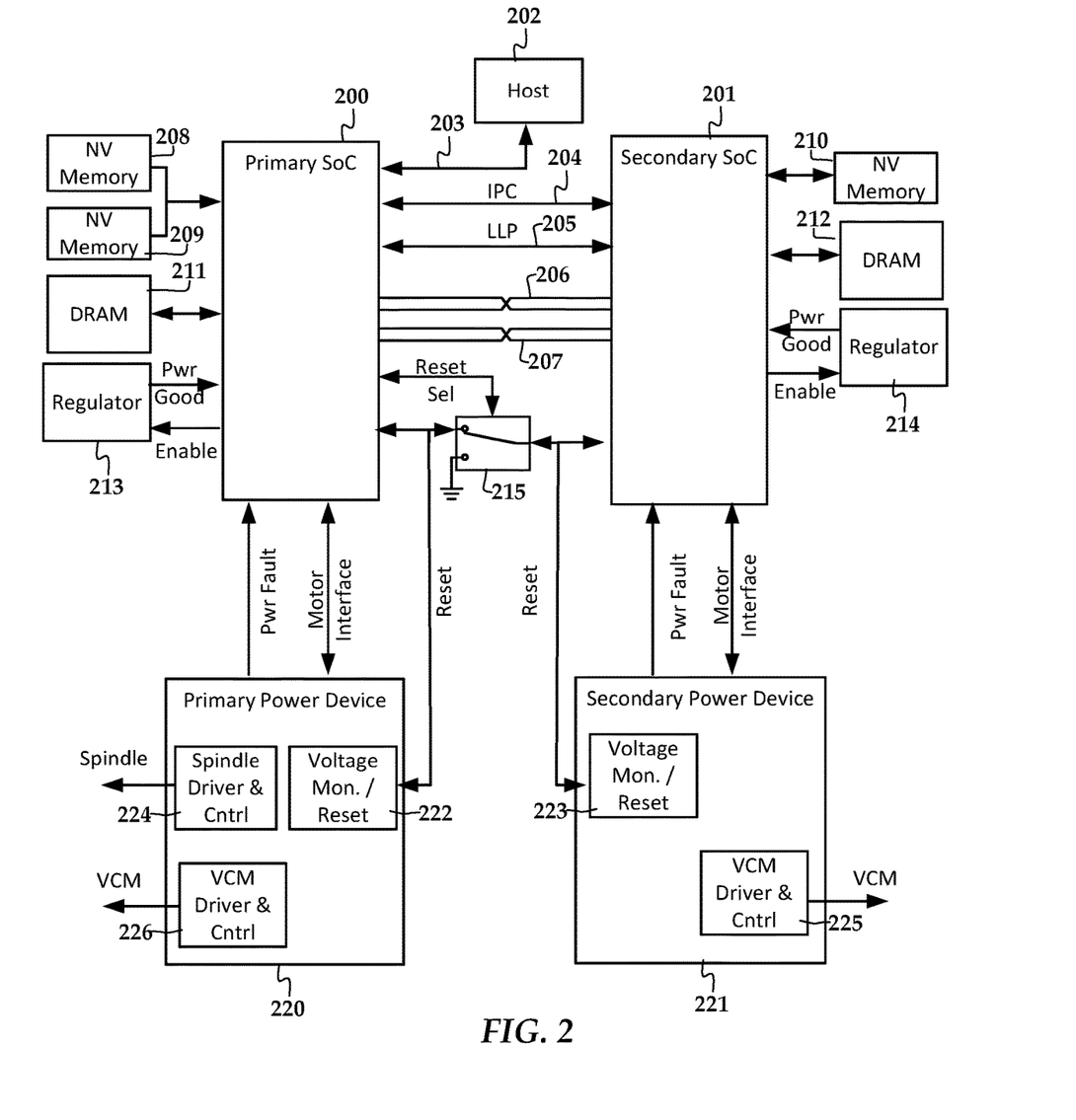
FIG. 2 is a block diagram of a multiple controller architecture according to an example embodiment.

In FIG. 2, a block diagram illustrates a multiple-controller architecture with features for managing unexpected shutdowns according to an example embodiment. In this example the system includes two systems on a chip (SoC) 200, 201. Each SoC 200, 201 includes at least a processor, e.g., a central processing unit (CPU), as well as interface circuitry. The CPUs may have multiple processing sections (e.g., cores) that independently manage servo and system-level control functions. The SoC 200 is configured as a primary and the SoC 201 is configured as a secondary or auxiliary. The hardware and firmware of each SoC 200, 201 may be identical, so selection of primary or secondary roles may be set via an input/output (I/O) port of the SoC 200, 201, e.g., grounding a particular general purpose I/O (GPIO) pin. Note that this architecture may be extended to more than two or more SoCs, e.g., and architecture with one primary SoC and multiple secondary SoCs.

One result of the primary and secondary role in this example is that the primary SoC 200 manages communications with the host 202, which may include a computer and/or storage interface card. The host communications are carried out over a host interface 203, which is generally an industry standard storage interface such as SATA, SAS, NVMe, etc. The secondary SoC 201 sends data to and receives data from the host 202 via the first SoC 200. The SoCs 200, 201 can communicate with each other via one or more of an inter-process communications (IPC) bus 204, a low latency port (LLP) 205, and GPIO handshake lines 206, 207. The IPC bus 204 may be implemented using SAS, PCI-X Bus, etc, and is used for large data transfers, such as user data that is sent to and from the host 202. The LLP 205 is used for sending short, time-critical, messages between the SoCs 200, 201, and low-level firmware communications are coordinated via the GPIO handshake lines 206, 207. One set 206 of the lines are used for system controller purposes and the other set 207 of the lines are used for servo controller purposes.

The SoCs 200, 201 are coupled to respective non-volatile (NV) units 208-210, e.g., flash memory, that are used to store firmware settings, system state, etc. Each SoC has dedicated DRAM 211, 212 and a power regulator 213, 214. The DRAM 211, 212 is used by the firmware during operation and stores data and instructions used by the system and servo controllers, as well as storing cache data, e.g., write cache. The regulators 213, 214 condition and regulate electrical power used by the drive, and indicate to the SoC 200, 201 the state of the system power.

The system shown in FIG. 2 includes power devices 220, 221 dedicated to the respective SoCs 200, 201. The power devices 220, 221 both monitor system voltage via modules 222, 223. If either power device 220, 221 detects the voltage dropping below a threshold value for a threshold amount of time or other fault event, then the device manages the safeguarding of the system. Note that the fault event need not be only power-related. For example, an event such as a motor fault may indicate a reduction or loss in BEMF from the motor such that if power loss did occur, the ability to back up data may be impaired. In such a case, certain actions described below, such as backing up the write cache to non-volatile memory, may occur even though power loss is not yet indicated.

Spindle controller 224 is configured to cause the system to obtain power from the spindle motor while the disks are still spinning. Respective VCM controllers 226, 225 manage the parking of the heads via inputs to the VCM actuators. The power device 220, 221 also signal to the SoCs 200, 201 to back up any write cache data (or any other data stored in non-volatile memory that should be saved) to one or more of the NV memory units 208-210. The first and second power devices 220, 221 can be implemented as two independent power devices or a single power device with multiple VCM controllers 225, 226. In either implementation, there only need be one spindle controller 224 that powers the apparatus via BEMF. Note that one or both of the VCM controllers 225, 226 may individually control more than one VCM. For example, a system may have one split actuator (e.g., actuator 114 in FIG. 1) and another actuator at a different pivot location than the split actuator (e.g., actuator 124 in FIG. 1). In such a configuration, one of the VCM controllers 225, 226 could control both of the independently movable sections of the split actuator.

In this embodiment, all of the non-volatile backup data is saved to at least one of the NV memory units 208, 209 that are controlled by the primary SoC 200. Thus, as will be described in greater detail below, the primary SoC 200 will manage obtaining the backup data from the secondary SoC 201 while also managing the backup of its own data to the NV memory. A shutdown sequence where the primary SoC 200 saves all of the data according to an example embodiment is shown in the sequence diagram of FIG. 3. The sequence begins when the primary power device 220 detects an early undervoltage warning and/or other event that indicates an unexpected shutdown and sends a triggering signal 300a to a system controller 200a of the primary SoC 200. Note that this sequence could also begin with the secondary power device 221 (see FIG. 4) sending a similar signal to system controller 201a of the secondary SoC 201. The power device 220 also sends a triggering signal 300b to the primary servo 200b, which will treat signal 300b the same as message 302.

Figure 3:
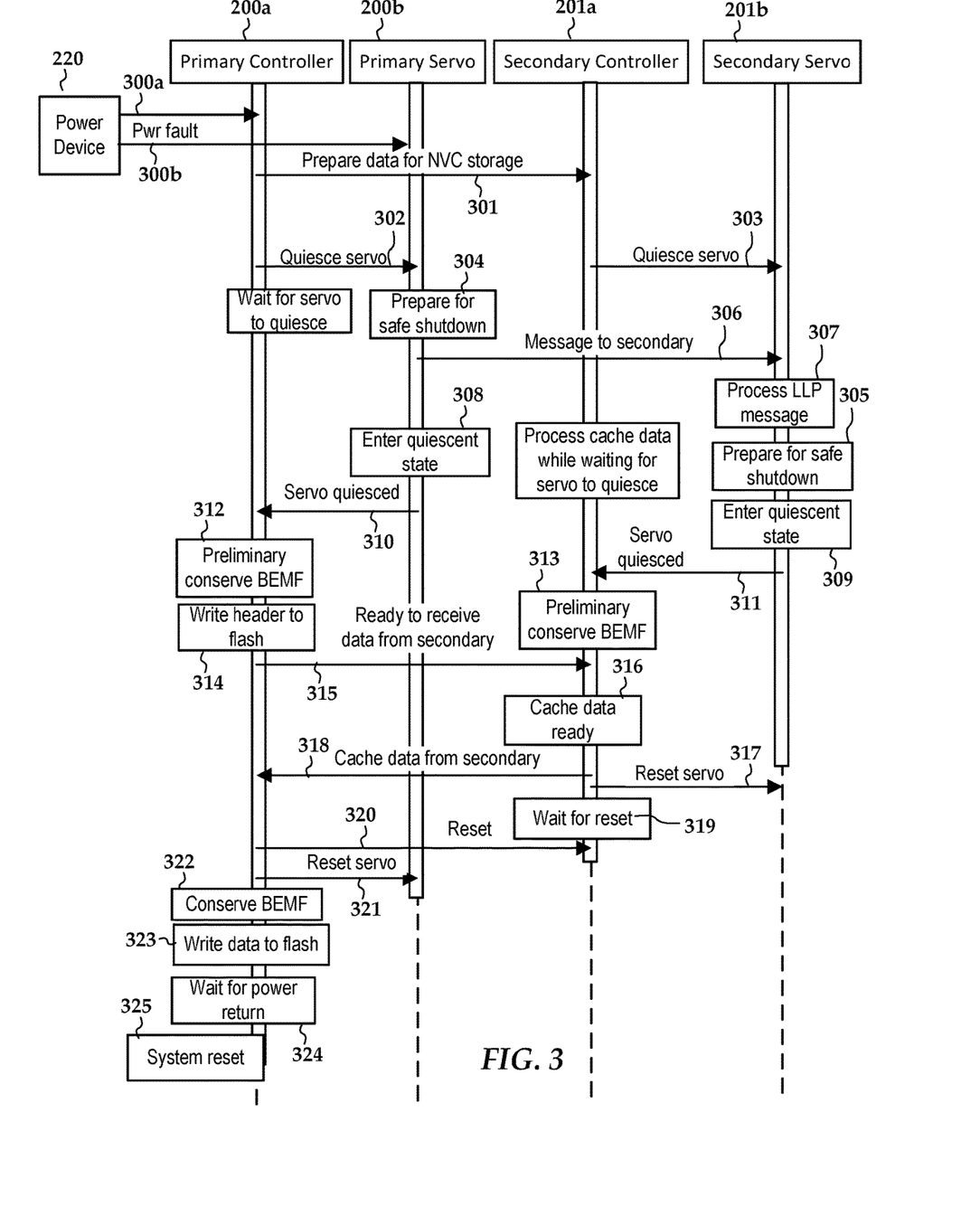
FIGS. 3 and 4 are sequence diagrams showing shutdown procedures according to example embodiments.

The triggering signal 300a results in a message 301 sent from the primary SoC system controller 200a to the secondary SoC system controller 201a. The triggering event 300a also results in communications to the servo processors 200b, 201b via messages 302, 303. Note that, unless otherwise indicated, the messages between the SoCs 200, 201 may be sent via the LLP 205 or IPC 204 (see FIG. 2) while message sent within the SoCs (e.g., messages 302 and 303) are sent by mechanisms provided by the SoC and associated firmware, e.g., pipes, sockets, shared memory, etc.

Messages 302, 303 result in the servo processors first preparing 304, 305 for safe shut down, which may involve actuator smart braking, head unload and spindle BEMF conservation. Example BEMF conservation schemes are described in commonly owned U.S. Pat. No. 8,924,641, issued Dec. 30, 2014, which is hereby incorporated by reference. Note that the secondary servo processor 201b first waits to process 307 a message 306 sent from the primary servo processor 200b before preparing 305 for safe shutdown. This allows coordinating the actuator operations to prevent a spike in electrical load that may cause the BEMF voltage to fall to unsafe levels.

After the servo processors 200b, 201b have prepared 304, 305 for shutdown, the servo processors 200b, 201b enter 308, 309 a quiescent state, leaving them in a low power state but not completely shut down. For example, the quiescent state can be achieved on an ARM processor using a WFI instruction, which can cause the processor 200b, 201b to enter either standby, dormant or shutdown mode, where an interrupt is used to wake-up the processor. After the servo processors 200b, 201b have entered the quiescent states, this will be communicated 310, 311 to the respective system controllers 200a, 201a.

After the system controllers 200a, 201a have determined (based on messages 310, 311) that the servo processors have quiesced, the system controllers 200a, 201a will take preliminary actions 312, 313 to conserve power. These actions 312, 313 may include at least shutting down electronics no longer needed (e.g., regulators, digital signal subprocessors, channel hardware, etc.). The primary system controller 200a will also write 314 the header to flash memory (or other NV memory). The header serves as "breadcrumbs" indicating that a fault or other event occurred, the source of the fault/event (power loss, over voltage, etc.), a description of outstanding data, etc.

After the header is written 314, the primary system controller 200a sends a message 315 to the secondary system controller 201a indicating the primary is ready to accept cache data. The secondary system controller 201a gathers the cache data (and other data to be backed up) and sends 318 it to the primary system controller 200a, which may involve sending via the IPC channel 204 (see FIG. 2). The secondary system controller 201a also places the secondary servo processor into reset 317 either before or after sending 318 the cache data. The secondary system controller 201a then enters 319 a WFI low power state waiting to be placed in reset.

The primary system controller 200a places 320 the secondary system controller 201a into reset by changing state of switch 215 (see FIG. 2). At this point, the primary system controller 200a executes the final shutdown operations, including placing 321 the primary servo controller 200b into reset. The primary system controller 200a then prepares cache data in RAM for backup and writes the data 323 to NV storage, e.g., flash. This may involve, for example, identifying the extent of data in the cache that has not been successfully written. Note that this may include preparing other data besides cache data for backup, such as certain system state data in RAM that may need to be preserved. After writing 323, the primary system controller 200a processor then waits 324 for power to return, as indicated by system reset 325.

Figure 4:
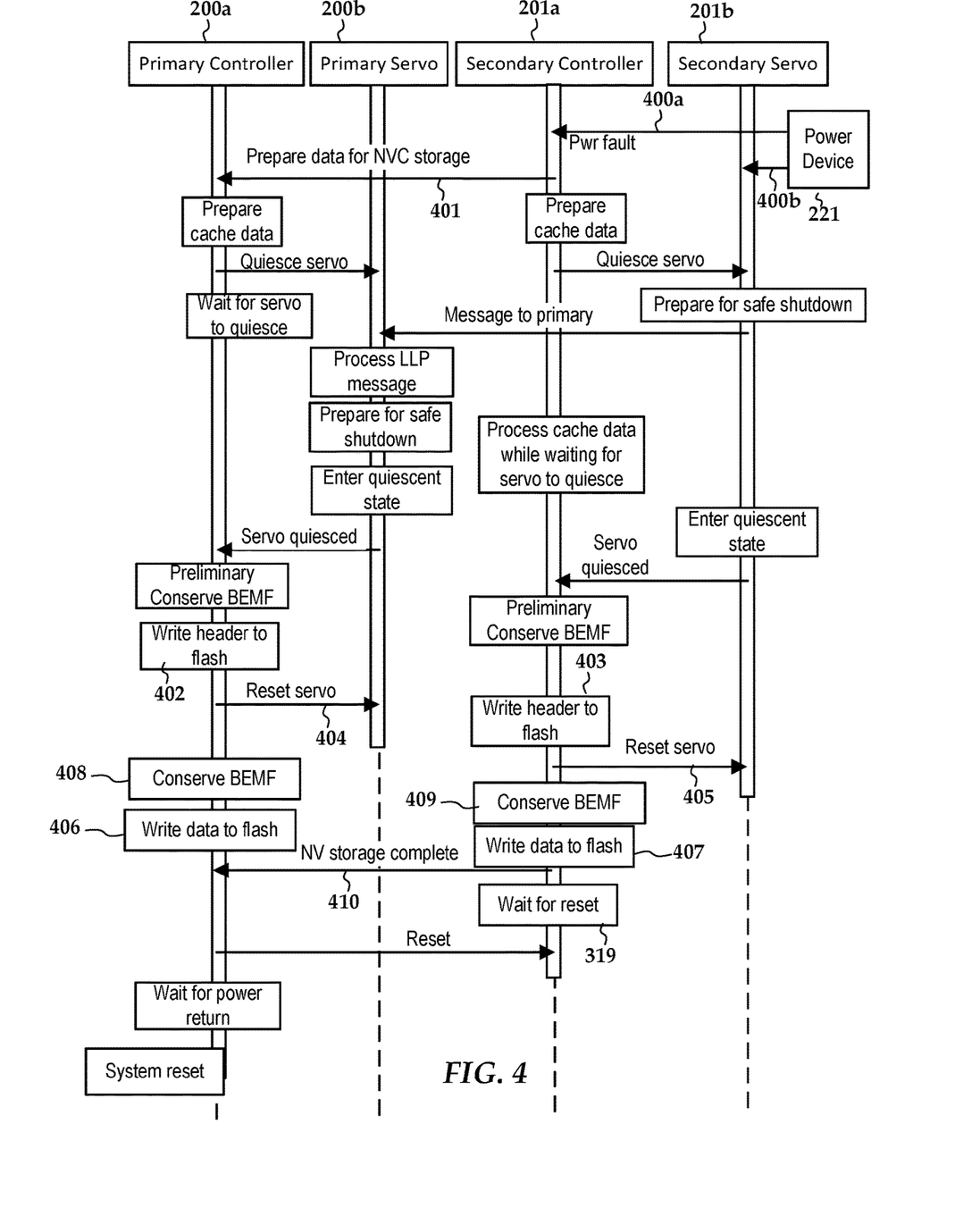

The scenario above, a single NV storage unit coupled to the primary system controller 200a was used to store all of the backed up data. In some cases, both system controllers 200a, 201a may have access to dedicated NV storage. In FIG. 4, a sequence diagram shows a shutdown sequence where each SoC 200, 201 uses its own NV storage for backup. In this sequence, the secondary power device 221 detects an early undervoltage warning and/or other fault event and sends a triggering signal 400a to the secondary system controller 201a of the primary SoC 200. In this case, a message 401 is sent from the secondary SoC system controller 201a to the primary SoC system controller 200a to begin the shutdown. Signal 400b may also be sent to secondary servo 201b to coordinate power shed within servos 200b, 201b. Signal 400b will be treated the same as message 303 to secondary servo 201b. Note that this sequence is an alternate to the triggering sequence shown in FIG. 3, and either sequence can be used in both of these embodiments.

Between operations 401 and 402, the operations shown in FIG. 4 are the same or similar to operations having the same name that are shown in FIG. 3, and so reference is made to the description of FIG. 3 for explanation of those operations. In this example, system controllers 200a, 200b write 402, 403 headers to flash memory after preliminary conserve BEMF. Then both the primary and secondary system controllers 200a, 201a reset servo processors 404, 405, conserve BEMF 408, 409 and write data to flash 406, 407. The secondary system controller 201a then signals 410 to the primary that the backup storage to NV memory is complete. Thereafter, the remaining shutdown operations can occur similar to operations 319, 320, 324, 325 shown in FIG. 3.

Figure 5:
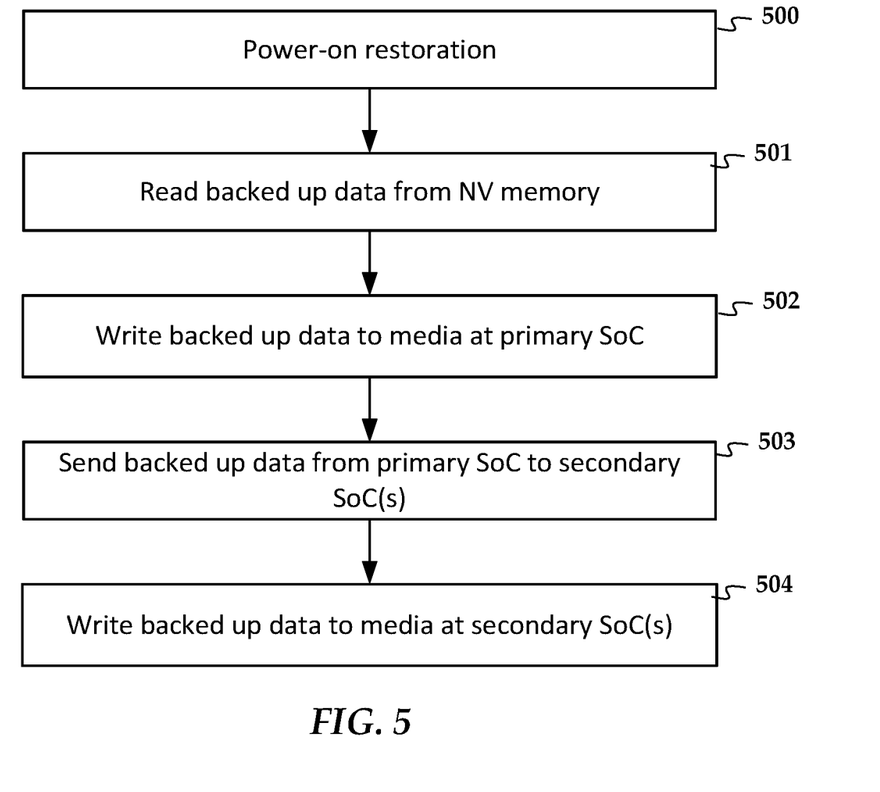
FIG. 5 is a flowchart showing a startup procedure according to an example embodiment.

In FIG. 5, a flowchart shows an example of power-on restoration process 500 according to an example embodiment. In this example, the cache data was stored on NV memory attached to the primary SoC as shown for example in FIG. 3. During data restoration, the primary processor reads 501 data from the NV memory. The primary will write 502 its own backup up data to the appropriate media, e.g., to the disk and/or to other NV memory used by the firmware. The primary processor will send 503 over the data that was saved off for the secondary processor(s). The data movement can occur over the IPC bus. Each secondary processor(s) will process the data by at least writing 504 it to the appropriate media.

Generally, before the drive can perform an operation that will cause it to lose the ability to write data to flash on a power loss, it will write the cache data to a non-volatile location, either flash or disc. Examples of operations that would cause the drive to lose the ability to write data to flash on a power loss include starting flash operations that take a long time like erases, starting an operation that would prevent firmware from receiving notification of a power loss, or spinning down the disc so there isn't enough BEMF to power the flash save operation. In some embodiments, the primary SoC system controller processor initiates all such saves. In other embodiments, the primary system controller processor and secondary system controller processor(s) will independently save their cache data. For cache data that has already been written to the disc, both primary and secondary SoC controllers will prevent cache data from changing until the ability to write to flash on power loss is restored and the cache data has been deleted from non-volatile media.

In these embodiments, retracting of all heads/actuators should be ensured upon unexpected shutdown. Depending on the fault condition and timing of the power loss event, firmware or hardware will initiate the retract event of heads, which is performed by the power device hardware. The power device hardware (e.g., devices 220 and 221 in FIG. 2) may be used to ensure all retracts are coordinated and can be staggered in time to reduce BEMF loading spikes. During normal operation, the controllers coordinate to prevent multiple actuators from performing simultaneous high velocity seeks, in particular towards the inner-diameter (away from the retract direction, the retract direction being the outer diameter where a ramp is located). In this way, if an unexpected shutdown occurs, the total power needed to retract all actuators is reduced. More generally, seek operations are limited to a specified maximum amount of retract power (e.g., to limit voltage drop). Smart brake methods allow programmable braking voltage and braking time as a function of seek velocity in order to brake efficiently while considering power and required braking velocity. Coordination of braking voltage and braking times amongst actuators can be accomplished via LLP communication between servo processors.

Figure 6:
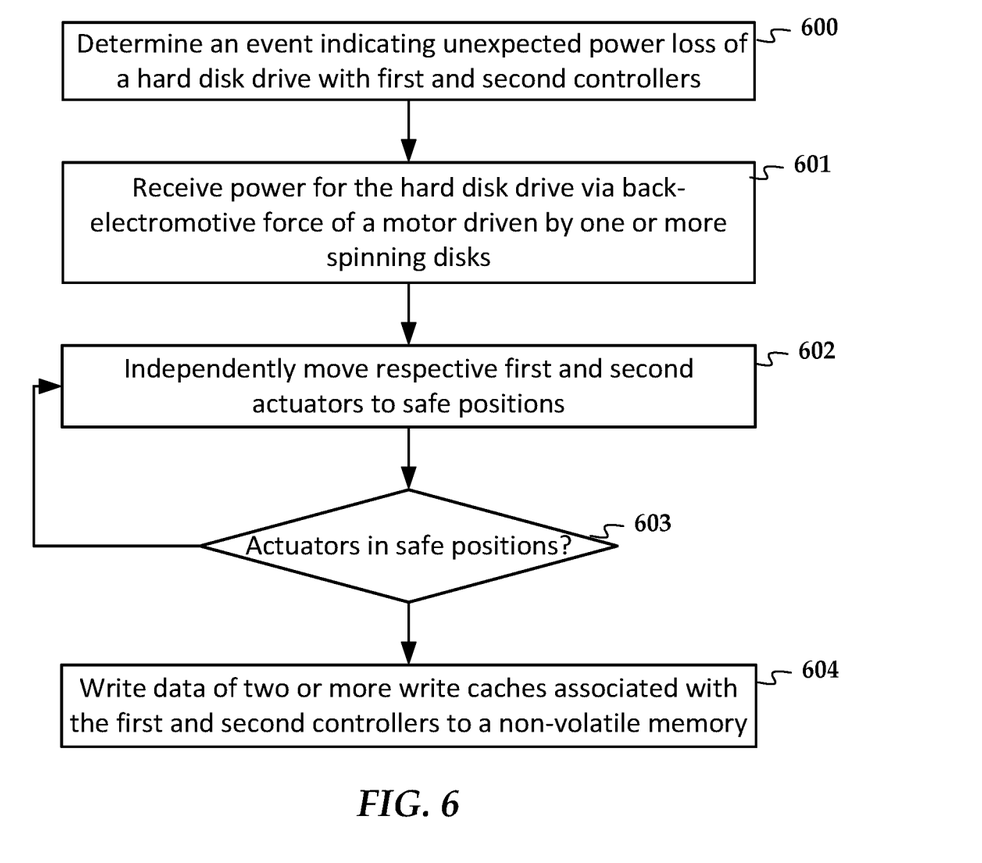
FIG. 6 is a flowchart of a method according to an example embodiment.

In FIG. 6, a flowchart shows a method according to an example embodiment. The method involves determining 600 an event that indicates unexpected shutdown of a hard disk drive. The hard disk drive has first and second controllers that control respective first and second independently-operable actuators. Each of the actuators includes at least one respective head that accesses one or more spinning disks of the hard disk drive. In response to the event, the drive receives 601 power for the hard disk drive via back-electromotive force of a motor driven by the one or more spinning disks. While receiving the power via the motor, the drive performs a shutdown procedure that includes causing the first and second controllers to independently move 602 the respective first and second actuators to safe positions. In response to determining 603 the first and second actuators are in safe positions, write cache data associated with the first and second controllers is written 604 to a non-volatile memory.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method comprising:
   determining an event that indicates unexpected shutdown of a hard disk drive comprising first and second controllers that control respective first and second independently-operable actuators, each of the actuators comprising one or more heads that access one or more spinning disks of the hard disk drive, each of the first and second controllers being coupled to respective two or more power loss detection circuits;
   while receiving power for the hard disk drive via back-electromotive force of a motor driven by the one or more spinning disks in response to the event, sending a signal from one of the first and second controllers that determines the event to another of the first and second controllers to performing a shutdown procedure comprising:
      causing the first and second controllers to independently move the respective first and second actuators to safe positions; and
      in response to determining the first and second actuators are in the safe positions, causing write cache data associated with the first and second controllers to be written to a non-volatile memory.

2. A method comprising:
   determining an event that indicates unexpected shutdown of a hard disk drive comprising primary and secondary controllers that control respective first and second independently-operable actuators, each of the actuators comprising one or more heads that access one or more spinning disks of the hard disk drive;
   while receiving power for the hard disk drive via back-electromotive force of a motor driven by the one or more spinning disks in response to the event, performing a shutdown procedure comprising:
   causing the primary and secondary controllers to independently move the respective first and second actuators to safe positions, and in response to determining the first and second actuators are in the safe positions, sending write cache data associated with the secondary controller from the secondary controller to the primary controller and writing the write cache data associated with the secondary controller to a non-volatile memory via the primary controller.

3. The method of claim 2, further comprising, after sending of and before writing the write cache data associated with the secondary controller, signaling from the primary controller to the secondary controller to reduce power consumption of the second controller.

4. The method of claim 2, wherein the write cache data associated with the primary controller is written to the non-volatile memory together with the write cache data associated with the secondary controller.

5. The method of claim 1, wherein causing the write cache data associated with the first and second controllers to be written to the non-volatile memory comprises causing the write cache data associated with the first and second controllers to be written to different first and second non-volatile memories.

6. The method of claim 1, wherein during normal operation, the first and second controllers coordinate to prevent the first and second actuators from performing simultaneous high velocity seeks away from a retract direction such that, when moving the first and second actuators to the safe positions in response to the event, a spike in electrical load is prevented that could cause a voltage of the power provided by the motor to fall below a threshold.

7. A method comprising:
   determining an event that indicates unexpected shutdown of a hard disk drive comprising first and second controllers that control respective first and second independently-operable actuators, each of the actuators comprising one or more heads that access one or more spinning disks of the hard disk drive;
   while receiving power for the hard disk drive via back-electromotive force of a motor driven by the one or more spinning disks in response to the event, performing a shutdown procedure comprising:
      causing the first and second controllers to independently move the respective first and second actuators to safe positions, a timing of the movement of the first and second actuators being coordinated to prevent a spike in electrical load that could cause a voltage of the power provided by the motor to fall below a threshold; and
      in response to determining the first and second actuators are in the safe positions, causing write cache data associated with the first and second controllers to be written to a nor-volatile memory.

8. An apparatus comprising:
   a first and second system on a chip (SoC) that control respective first and second independently-operable actuators, each of the actuators comprising one or more heads that access one or more spinning disks of the apparatus;
   one or more data busses that facilitate communication between the first and second SoC; and
   one or more power devices coupled to the first and second SoC and operable to:
      determine an event that indicates unexpected shutdown of the apparatus; and
      power the apparatus via back-electromotive force of a motor driven by the one or more spinning disks in response to the event;
   the first and second SoC and the one or more power devices operable to perform a shutdown procedure while receiving the power via the back-electromotive force, the shutdown procedure comprising:
      independently moving the respective first and second actuators to safe positions; and
      in response to determining the first and second actuators are in the safe positions, causing write cache data associated with the first and second SoC to be written to a non-volatile memory.

9. The apparatus of claim 8, wherein the first and second SoC comprise a primary SoC and a secondary SoC that control the respective first and second actuators, the primary and secondary SoCs further operable to: send the write cache data associated with the secondary SoC from the secondary SoC to the primary SoC; and write the write cache data associated with the secondary SoC to the non-volatile memory via the primary SoC.

10. The apparatus of claim 9, wherein the one or more data busses comprise a high-speed, interprocessor communications (IPC) bus, and wherein the write cache data associated with the secondary SoC is sent from the secondary SoC to the primary SoC via the IPC bus.

11. The apparatus of claim 9, wherein the first and second SoC are further operable to, after sending and before writing the write cache data associated with the secondary SoC, send a signal from the first SoC to the second SoC to reduce power consumption of the second SoC.

12. The apparatus of claim 11, wherein the write cache data associated with the primary SoC is written to the non-volatile memory together with the write cache data associated with the secondary SoC.

13. The apparatus of claim 8, wherein whichever of the first and second power devices first determines the event signals to the respective first or second SoC to begin the shutdown procedure.

14. The apparatus of claim 8, wherein a timing of the movement of the first and second actuators is coordinated to prevent a spike in electrical load that could cause a voltage of the power provided by the motor to fall below a threshold.

15. The apparatus of claim 8, wherein during normal operation, the first and second controllers coordinate to prevent the first and second actuators from performing simultaneous high velocity seeks away from a retract direction such that, when moving the first and second actuators to the safe positions in response to the event, a spike in electrical load is prevented that could cause a voltage of the power provided by the motor to fall below a threshold.

16. The apparatus of claim 14, wherein the one or more data busses comprise a low-latency port, and wherein a message used to coordinate the timing is sent via the low-latency port.

* * * * *